United States Patent [19]

Kitaura

[11] 4,445,675

[45] May 1, 1984

[54] WORK-CLAMPING UNIT FOR USE IN MACHINE TOOLS

[75] Inventor: Ichiro Kitaura, Itamishi, Japan

[73] Assignee: AIOI Seiki Kabushiki Kaisha, Japan

[21] Appl. No.: 322,660

[22] Filed: Nov. 18, 1981

[30] Foreign Application Priority Data

Dec. 2, 1980 [JP] Japan .......................... 55-173384[U]

[51] Int. Cl.[3] .............................................. B23Q 7/00

[52] U.S. Cl. ...................................... 269/20; 269/93; 269/900

[58] Field of Search ...................................... 269/25–27, 269/32, 20, 91, 93, 94, 900, 21

[56] References Cited

U.S. PATENT DOCUMENTS

| | | | |
|---|---|---|---|
| 2,421,957 | 6/1947 | Mead | 269/94 |
| 3,700,227 | 10/1972 | Sessody | 269/32 |
| 3,830,485 | 8/1974 | Mickelsson et al. | 269/25 |
| 4,174,828 | 11/1979 | Bergman | 269/94 |
| 4,179,106 | 12/1979 | Bergman | 269/20 |
| 4,275,983 | 6/1981 | Bergman | 269/20 |
| 4,286,778 | 9/1981 | Follmeyer | 269/91 |

FOREIGN PATENT DOCUMENTS

| | | | |
|---|---|---|---|
| 2421644 | 11/1975 | Fed. Rep. of Germany | 269/20 |

*Primary Examiner*—Robert C. Watson

*Attorney, Agent, or Firm*—Bacon & Thomas

[57] ABSTRACT

A work-clamping unit includes a base plate in which hydraulic cylinders are totally embedded, each cylinder including a piston vertically movable beneath the top surface of the base plate, the piston being adapted to carry a clamping member detachably connected thereto so as to transmit a clamping force from the piston to the clamping member, the base plate additionally including an oil path for feeding hydraulic pressure to each of the cylinders.

10 Claims, 14 Drawing Figures

WORK-CLAMPING UNIT FOR USE IN MACHINE TOOLS

BACKGROUND OF THE INVENTION

1. Field of the Invention

This invention relates to a work-clamping unit for use in machine tools, and more particularly, to a hydraulically operating clamping unit allowing a plurality of works to be loaded thereon, the units being replaceable one after another on the table of the machine tool when the works are finished in machining.

2. Description of the Prior Art

In machine tools it is necessary to hold a work or works on the table (sometimes in the vise). When the machine tool is for a single specific purpose, such as drilling and planing, the works are the same in size and shape. This makes it possible to employ a standardized clamping device, and the clamping operation is simple and easy. But when the machine tools are for all purposes, the works are various in size and shape; generally, smaller works are handled for mass production. To handle a number of small works, the mechanism of the clamping device tends to be complicated. Recently N.C. (numerical control) machine tools are in wide use for mass production. Under the operation of N.C. machine tools it has been found that the work clamping requires much time, thereby negating the efficiency of the machines. During the work clamping the machines are at rest. In the light of their expensive prices it is uneconomical, which will be reflected in the prices of products.

To overcome this problem, proposals have been made for automatic clamping operation to meet the requirements under the numerical control. But no successful models have been achieved.

The present invention aims at solving the problems pointed out above with respect to the conventional clamping devices, and has for its object to provide an improved work-clamping unit capable of handling works of relatively small size and of various shapes.

Another object of the invention is to provide an improved work-clamping unit replaceable one after another when each machining operation is finished, thereby enabling the machine tool to operate with the minimum rest.

A further object of the invention is to provide an improved work-clamping unit having a base plate normally used as the clamping plane but usable as the working table even when the plane lacks the works in places. Therefore, it is not necessary to suspend the operation of the machine.

Other objects and advantages of the present invention will become more apparent from the following description when taking in connection with the accompanying drawings which show, for the purpose of illustration only, embodiments in accordance with the present invention.

SUMMARY OF THE INVENTION

According to one advantageous aspect of the present invention, a work-clamping unit includes a base plate in which hydraulic cylinders are totally embedded, each cylinder including a piston vertically movable beneath the top surface of the base plate, the piston being adapted to carry a clamping member detachably connected thereto so as to transmit a clamping force from the piston to the clamping member, the base plate additionally including an oil path for feeding hydraulic pressure to each of the cylinders. Additionally, the cylinder may be made inoperative by replacing the clamping member with a plug element.

DETAILED DESCRIPTION OF THE INVENTION

Figure 1:
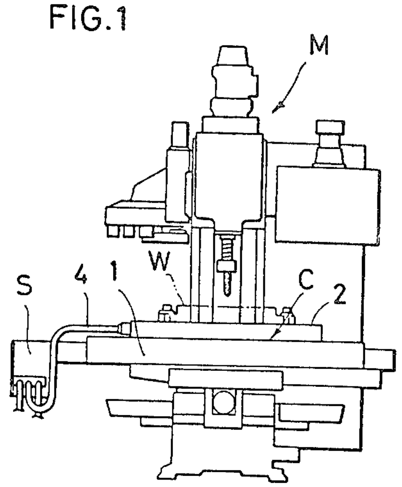
FIG. 1 is a front view showing a machine tool incorporating a work-clamping unit according to the present invention.
Figure 2:
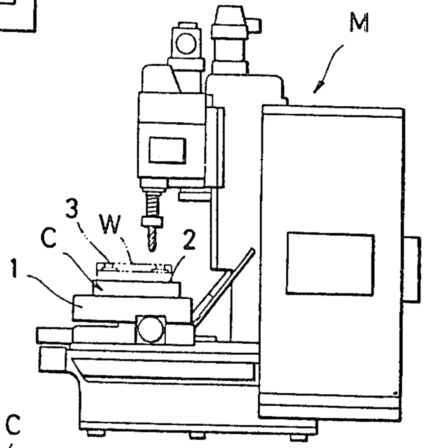
FIG. 2 is a side view of the machine tool in FIG. 1.

Referring to FIGS. 1 and 2, a drilling machine (M) includes a horizontal table 1 on which a clamp unit (C) is mounted. The clamp unit (C) has a flat top surface 2 on which a work (W) is held by means of clamping members. The clamping force is imparted to the clamping members 3 in the form of hydraulic pressure, which is fed from a hydraulic supply source (S) through a pipe 4.

Figure 3:
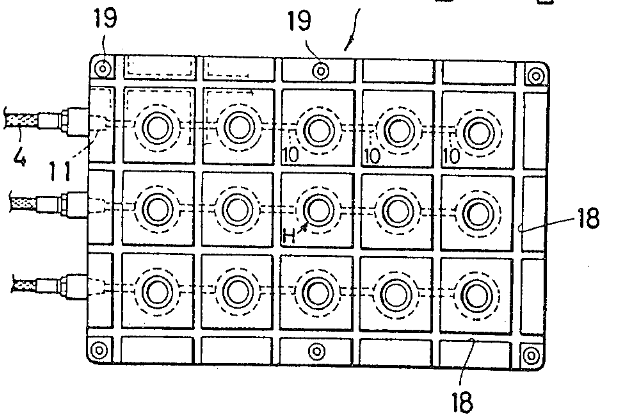
FIG. 3 is a plan view of a work-clamping unit according to the present invention.
Figure 4:
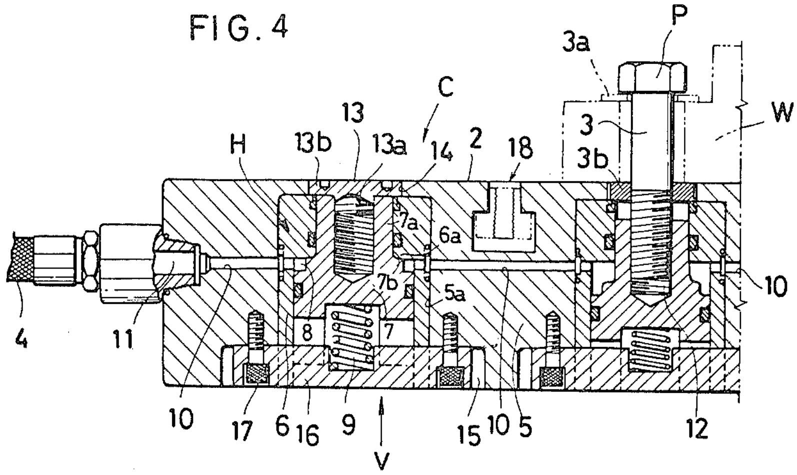
FIG. 4 is a vertical cross-section on an enlarged scale through the main section of the work-clamping unit.

Referring to FIGS. 3 to 6, the clamp unit (C) will be explained in greater detail:

The clamp unit (C) includes a base plate 5 as a matrix, made of a thick steel in which 15 hydraulic cylinders (H) are totally embedded at equal spaces so as to form 3 lines and 5 rows as best shown in FIG. 3. The hydraulic cylinders (H) are single-acting types, each consisting of a stationary section 6 and a movable section 7. The stationary section 6 is the cylinder itself, and the movable section 7 is a piston. The cylinder 6 is fitted in a hole 5*a* produced in the under-surface of the base plate 5. The piston 7 is inserted in the cylinder 6 and vertically moves within the limit that its rod 7*a* never rises up the top surface 2 of the base plate 5. When an oil is introduced into an oil chamber 8, the piston 7 is caused to descend against a spring 9, and when the oil is withdrawn, the piston 7 restores under the action of the spring 9. The cylinder 6 has a shoulder 6*a*, and the piston 7 has a shoulder 7*b*. When the piston 7 ascends, these shoulders come into abutment, and the piston 7 is prevented from its further upward movement. The hydraulic cylinders (H) in the same line are communicated by an oil path 10 passing through the base plate 5 such that the oil chambers 8 in each cylinder are communicated one after another. The oil path 10 is supplied with oil at a port 11 at which the pipe 4 is connected to the base plate 5.

The piston rod 7*a* includes a hole 12 so threaded as to receive a threaded portion of a clamping bolt 3, thereby effecting their associated movement. The clamping bolt 3 includes a head (P), which is intended to hold a workpiece (W) against the top surface 2 of the base plate 5. In this case an auxiliary clamping plate 3*a* on the work (W) receives the head (P). The workpiece (W) is held by the clamping plate 3*a* at its edge portion. Each hydraulic cylinder (H) is protected against a possible intrusion of machining chips by means of a ring-shaped rubber packing 3*b*.

An opening 14 is provided concentric with the oil pressure cylinder 6. The opening 14 is of a larger diameter than the piston rod 7*a*. The opening 14 is also provided in the surface 2 of the base plate 5 above each cylinder 6. When cylinder 6 is not used for connection with a clamping bolt 3, the opening 14 is covered with a plug 13 and a foot portion 13*a* of the plug 13 is screwed into the screw hole 12 of the piston rod 7*a*. A shoulder portion 13*b* of the plug 13 is received by the cylinder 6 so that the piston 7 is fixed in the upper position. In this way the piston 7 is prevented from descending when oil is introduced into the oil chamber 8. The plug 13 has a flat top surface flush with or alternatively slightly beneath, the top surface 2 of the base plate 5. The plug 13 is also useful in protecting the hydraulic cylinder (H) against a possible intrusion of machining chips. By making the unused hydraulic cylinder inactive, the hydraulic action in the used hydraulic cylinders (H) advantageously becomes more active, thereby securing a quicker action of the pistons 7. In addition, the life of the hydraulic cylinders (H) can be prolonged.

Figure 5:
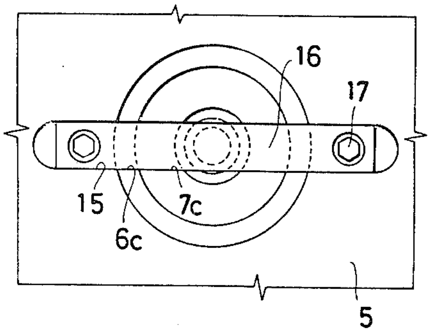
FIG. 5 is a bottom view of the portion indicated by the arrow V in FIG. 4.

When the clamping bolt 3 is screwed in the piston rod 7*a*, the piston tends to rotate. To prevent it, a stopper 16 is embedded in a recess 15 produced in the bottom of the base plate 5, the stopper 16 being fastened by means of bolts 17. The stopper 16 is also engaged in recesses 6*c* and 7*c* produced in the cylinder 6 and the piston 7, respectively, as shown in FIG. 5. The stopper 16 also serves to fasten the cylinder 6 to the base plate 5 and serves to support the spring 9.

As shown in FIG. 3, the top surface 2 of the base plate 5 is provided with T-shaped grooves 18 arranged in the pattern of a fretwork. The grooves 18 are helpful for holding the work (W) on the base plate 5. The clamp unit (c) is fastened to the table 1 by means of bolts through holes 19.

Figure 6:
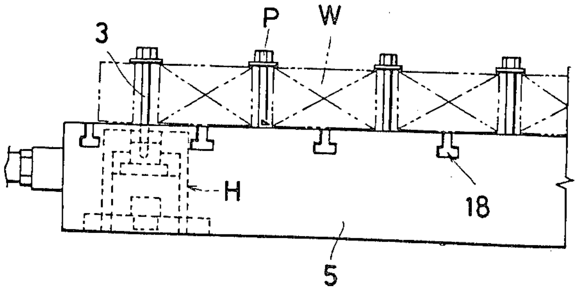
FIG. 6 is a front view of the work-clamping unit on which works of the same size and shape are loaded.

FIG. 6 shows, as an example, that a plurality of works (W) of same size are held.

Figure 7:
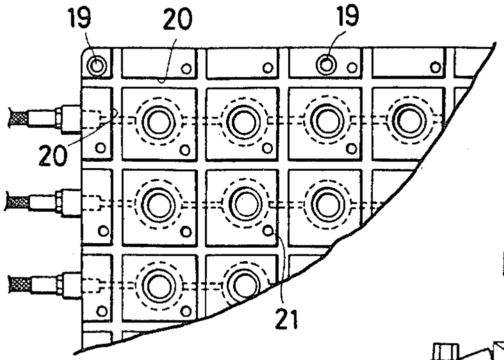
FIG. 7 is a plan view, partly omitted, of an alternative embodiment.
Figure 8:
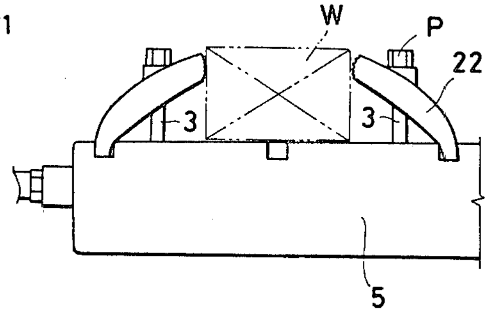
FIG. 8 is a front view of a partly modified version of the embodiment of FIG. 7.

Referring to FIGS. 7 and 8, modifications of the invention will be explained:

The embodiment illustrated in FIGS. 7 and 8 is provided with rectangular grooves 20 instead of the T-shaped ones. In addition, holes 21 for receiving auxiliary bolts or rods for positioning the work (W) are arranged with equal spaces along horizontal and vertical lines as best shown in FIG. 7. In this embodiment a jig 22 as a side support can be used to support the work (W) at its side when it is clamped by means of the clamping bolts 3.

Figure 9:
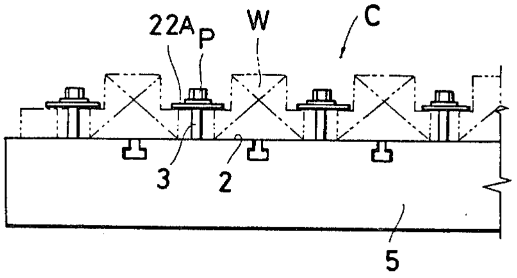
FIG. 9 is a front view of a further modified version of the embodiment.
Figure 10:
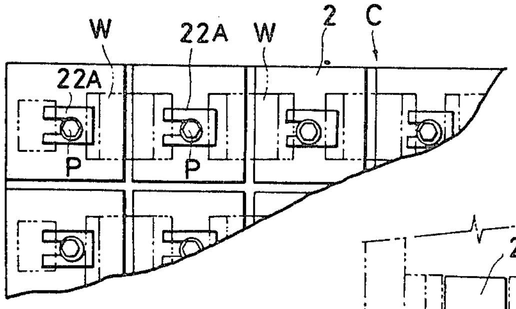
FIG. 10 is a plan view of the embodiment in FIG. 9.

FIGS. 9 and 10 show a further modification in which a fork-shaped or U-shaped jig 22B are used to oppress the adjacent works (W) against the top surface 2 of the base plate 5. This is particularly effective when the works (W) have steps as shown in FIG. 9.

Figure 11:
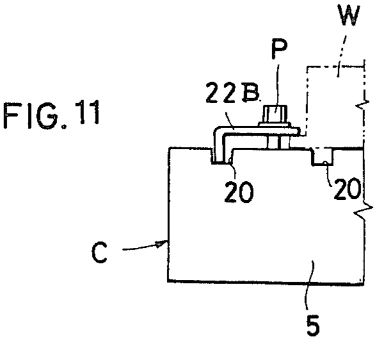
FIG. 11 is a front view, partly omitted, of a still further modified version of the embodiment.
Figure 12:
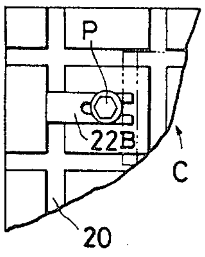
FIG. 12 is a plan view of the embodiment in FIG. 11.

FIGS. 11 and 12 show an embodiment in which L-shaped jigs 22B are used to hold the works (W). This is also effective when the works (W) have steps at their bottom portions as shown in FIG. 11. In this case, the terminating end of each L-shaped jig 22B is engaged in the grooves 20, thereby avoiding slipping on the top surface 2 of the base plate 5.

Figure 13:
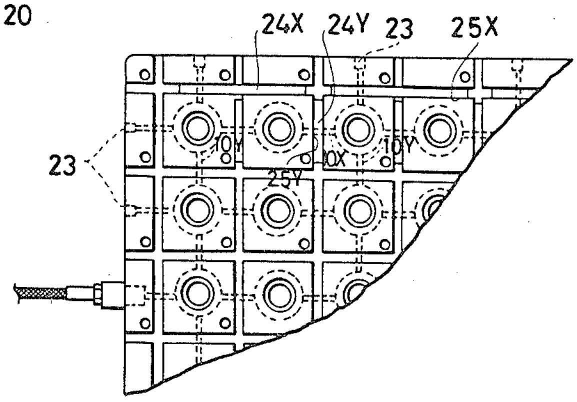
FIG. 13 is a plan view of another modified version of the embodiment.

FIG. 13 shows an alternative embodiment characterized by an arrangement of oil paths 10 produced along the lateral and longitudinal lines the oil paths communicatingly crossing at right angle. Owing to this fretwork pattern arrangement, a single pipe 4 can be enough. In FIG. 13 the oil paths along the horizontal line are designated by the reference numeral 10X, and the ones along the vertical lines by the reference numeral 10Y. The reference numeral 23 designates a plug for closing the oil path. The reference numerals 24X and 24Y designate keys inserted in the rectangular grooves 20, which keys are designed to locate the work (W) exactly at the clamping position. The sides of the keys, designated by the reference numerals 25X and 25Y, constitute defining walls against the work (W).

Figure 14:
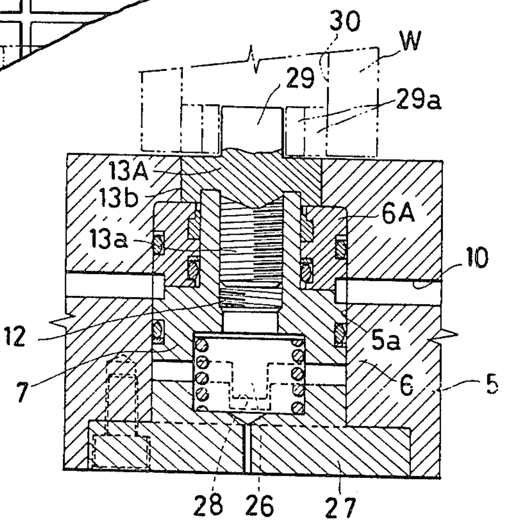
FIG. 14 is a vertical cross-section through a further modified version of the embodiment.

Referring to FIG. 14, a modified embodiment of the hydraulic cylinder (H) will be explained:

In the illustrated embodiment the stationary section 6 has no cylinder but is constituted by the hole 5*a* in which a ring 6A is fitted in its upper section. The piston 7 is provided with a tail 26 at its bottom, which is secured in a groove 28 produced in a bottom plate 27. Thus the tail 26 can prevent the piston 7 from rotating in the hole 5*a* during its up and down movement. The piston 7 is provided with a centering cap 13A at its top, wherein the centering cap is provided with a cylindrical centering projection 29 adapted to locate the centers by fitting in the holes 30 of the works (W). When the hole 30 is too large for the projection 29, an inserter 29*a* is additionally fitted around the projection 29.

The arrangement of the hydraulic cylinders (H) is not limited to the illustrated embodiment, but it can be formed in a triangle or any other desired patterns.

The shape and dimension of the base plate 5 and the distances between the hydraulic cylinders (H) and the capacity thereof are determined, as desired, in accordance with the size and type of the machine tools. Instead of using the base plate 5, it can be replaced by the work table itself, which means that the work table performs a clamping function as well as its own function as a work table.

What is claimed is:

1. A work-clamping unit for use in machine tools, said work-clamping unit comprising:

a base plate made of steel and provided with a top surface and a bottom surface;

said base plate including a plurality of separate and identical hydraulic cylinders totally embedded therein, and a stopper means provided on the bottom surface of the base plate in engagement with recesses in said hydraulic cylinders; said hydraulic cylinders being disposed in a given regular pattern, with each of said separate cylinders spaced a given regular distance longitudinally and transversely from each adjacent one of said separate cylinders, respectively;

each of said hydraulic cylinders including a piston vertically movable beneath said top surface of said base plate, and an oil chamber for actuating said piston downward, said stopper means in engagement with recesses provided in said piston, said piston having means for enabling a clamping member to be secured thereto so as to effect a unitary movement of said piston and said clamping member;

said stopper means provided to prevent rotation of said piston when said clamping member is secured to said piston and to fasten said cylinder to said base;

said top surface having openings for said clamping members to pass through, each of said openings being concentric with each of said hydraulic cylinders; and said base plate including an oil path for supplying each of said hydraulic cylinders with hydraulic pressure, said oil path being communicated with at least a hydraulic supply port, said oil path communicating in series with said oil chambers; hydraulic pressure from one cylinder to another.

2. A work-clamping unit as defined in claim 1, wherein said base plate is provided with T-shaped grooves in said top surface on which workpiece are clamped.

3. A work-clamping unit as defined in claim 1, wherein said piston in said hydraulic cylinder can be optionally made inoperative under hydraulic pressure by replacing said clamping member with a plug secured to said means in said piston.

4. A work-clamping unit as defined in claim 1, wherein said piston comprises a body portion and a rod portion with a shoulder interposed, said shoulder being adapted to limit the upward movement of said piston.

5. A work-clamping unit as defined in claim 1, further comprising a spring located under said piston so as to allow said piston to return when hydraulic pressure is withdrawn.

6. A work-clamping unit as defined in claim 1, wherein said means is a threaded hole.

7. A work-clamping unit as defined in claim 1, wherein said stopper means supports the spring pressing said piston upward.

8. A work-clamping unit as defined in claim 1, wherein said base plate is produced separately from the table of a machine tool, and is fastened thereto when in use.

9. A work-clamping unit as defined in claim 1, wherein said base plate is constituted by the table of a machine tool.

10. A work-clamping unit as defined in claim 1 wherein said piston is provided with a projection which extends into a recess of said stopper means so as to prevent rotation of said piston.

* * * * *